United States Patent [19]

Chung et al.

[11] Patent Number: 5,931,936

[45] Date of Patent: Aug. 3, 1999

[54] MULTIPLE INTERRUPT CONTROLLER AND CONTROL METHOD USING AN INTELLIGENT PRIORITY-DECISION MECHANISM

[75] Inventors: Ha Jae Chung; Jin Lee; Bae Wook Park, all of Daejon-Shi, Rep. of Korea

[73] Assignee: Electronics and Telecommunications Research Institute, Daejon, Rep. of Korea

[21] Appl. No.: 08/982,661

[22] Filed: Dec. 2, 1997

[30] Foreign Application Priority Data

Dec. 4, 1996 [KR] Rep. of Korea ...................... 96-61513

[51] Int. Cl.[6] ........................................................ G06F 9/46
[52] U.S. Cl. ............................ 710/263; 710/264; 710/268
[58] Field of Search ...................................... 710/260–269

[56] References Cited

U.S. PATENT DOCUMENTS

| 5,325,536 | 6/1994 | Chang et al. | 395/736 |
| 5,471,620 | 11/1995 | Shimizu et al. | 395/736 |
| 5,603,035 | 2/1997 | Erramoun et al. | 375/733 |
| 5,606,703 | 2/1997 | Brady et al. | 395/737 |
| 5,790,872 | 8/1998 | Nozue et al. | 395/740 |
| 5,819,112 | 10/1998 | Kusters | 395/856 |
| 5,857,108 | 1/1999 | Hong | 395/733 |
| 5,875,343 | 2/1999 | Binford et al. | 395/736 |

Primary Examiner—Ayaz R. Sheikh
Assistant Examiner—Raymond N Phan
Attorney, Agent, or Firm—Cohen, Pontani, Lieberman & Pavane

[57] ABSTRACT

The present invention relates to handling an interrupt between the multiple interrupt generating resources for use in connection with a pended bus and a host system, in which there is disclosed a multiple interrupt controller using an intelligent priority-decision mechanism and control method thereof which makes possible to transmit various interrupt resources within the system that is connected to the pended bus toward the host system through one interrupt line among the bus.

3 Claims, 4 Drawing Sheets

MULTIPLE INTERRUPT CONTROLLER AND CONTROL METHOD USING AN INTELLIGENT PRIORITY-DECISION MECHANISM

BACKGROUND OF THE INVENTION

1. Field of the Invention

The present invention relates to a multiple interrupt controller and control method using an intelligent priority-decision mechanism thereof in which a plurality of input/output (I/O) devices can multiplexedly use a single interrupt line in the environment in which a host bus uses limited interrupt resources within a computer system.

2. Description of the Prior Art

Today's trend is that various input/output (I/O) device chips are miniaturized, high integrated and are required to be equipped with multi-functions such as multimedia applications. In a computer system, most input/output (I/O) devices typically process data in itself and then send them to main memory or other input/output devices. At this time, to request the main processor to do the job, I/O devices use an interrupt. In this case, there is no problem in case that a single interrupt line is allocated to a single input/output device each by each. However, as mentioned above, in recent years, as multi-function chip or multi-function board are commonly used, the hardware resources in a single chip or in a single board desiring to use interrupts over a host bus are increased, and accordingly in many cases, many interrupt users have to share the single interrupt line of the host bus. In this environments, it is likely to be inefficient utilization of interrupt resources that the I/O device which adopts the highest priority uses interrupts almost exclusively, and the I/O devices which adopt the lowest priority tend to be starved etc.

In a conventional computer system, the input/output devices connected to Pended bus are in most cases allocated to only one interrupt. In recent years, in most cases since more than one interrupt generating resources connected to the bus exist within a single chip or single board due to miniaturization of chip, higher integration, and multi function of system, there are problems in handling and sharing an interrupt in this case. The problems that may occur in handling and sharing an interrupt include; a time delay of handling interrupt which is caused by the fact that more than one interrupts must be transmitted via a single pended interrupt line, and an interrupt starvation phenomenon due to fixed interrupt priority etc.

SUMMARY OF THE INVENTION

It is an object of the present invention to solve the problems involved in the prior art, and to provide a multiple interrupt controller and control method using an intelligent priority-decision mechanism thereof which can manage interrupts from local interrupt resources within a system using a queue and can automatically adjust occasionally the interrupt priority of interrupt resources using the ratio of an individual interrupt number to a given number of the total interrupt number as a priority decision factor.

To achieve the above object, a multiple interrupt controller using an intelligent priority-decision mechanism according to the present invention includes an interrupt detector for detecting interrupts from local interrupt resources; a total interrupt counter representing a total interrupt number detected at said interrupt detector; an individual interrupt counter for counting generation of a local interrupt per each of said local interrupt resources; an interrupt flag being set when the interrupt corresponding to itself is detected from said interrupt detector; an encoder and a priority decision device for encoding said corresponding interrupt information and deciding the priority using information of the total interrupt counters and the individual interrupt counter as a basic factor; an interrupt queue controller having a queue counter, for receiving a queue input request from said interrupt detector and a queue shift request from said interrupt queue output controller, controlling an interrupt queue, and then addressing the queue; an interrupt queue output controller for receiving a request from said host system so as to output an 0-th queue of the interrupt queue to said host system via the pended bus, and simultaneously requesting a queue shift for said interrupt queue controller; and an interrupt queue for preserving temporarily interrupts to be shifted when receiving a queue shift request from said interrupt queue output controller.

To achieve the object, a method of controlling a multiple interrupt using an intelligent priority-decision mechanism according to the present invention comprises the steps of: repeatedly confirming whether an interrupt has been detected; checking whether the number of the detected interrupt is more than one if an interrupt has been detected at said confirming step; if the number of the detected interrupt is one at said checking step, setting a corresponding flag thereto and after encoding the interrupt, requesting a queue input toward interrupt queue controller by interrupt detector; while checking the interrupt queue confirmation from said interrupt queue controller, resetting a corresponding flag thereto and then branching to a start state when receiving a queue input confirmation signal; if the number of the detected interrupt is more than one at said checking step, sequentially setting a total interrupt counter, a corresponding priority flag, an individual interrupt counter and after encoding the result, requesting a queue input toward interrupt queue controller by interrupt detector; and while checking a queue input confirmation from said interrupt queue controller, resetting a corresponding flag when receiving a queue input confirmation signal and then branching to said checking step.

To achieve the above object, a method of controlling a multiple interrupt using an intelligent priority decision mechanism according to the present invention comprises the steps of: repeatedly confirming at an interrupt queue controller whether a queue input request from an interrupt detector or a queue output request from a host system has been issued; if there is a queue input request from the interrupt detector at said confirming step, first checking whether the queue is empty or not; if there is an empty queue after said checking step, inputting it to a queue corresponding to the value of a present queue counter and then generating a queue input confirmation signal toward the interrupt detector, and after increasing the value of the queue counter by 1, branching to a start state; if there is a queue output request from said host system at said checking step, requesting an interrupt queue shift by said interrupt queue output controller toward said interrupt queue controller and then confirming a queue counter by said interrupt queue controller; and if the value of the queue counter is 1 at said requesting step, decreasing the value of the queue counter by 1 and branching to a start state, and if the value of the queue counter is not 1, right shifting the queue by 1, decreasing the value of the queue counter by 1 and then branching to a start state.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

DETAILED DESCRIPTION OF PREFERRED EMBODIMENT

Figure 1:
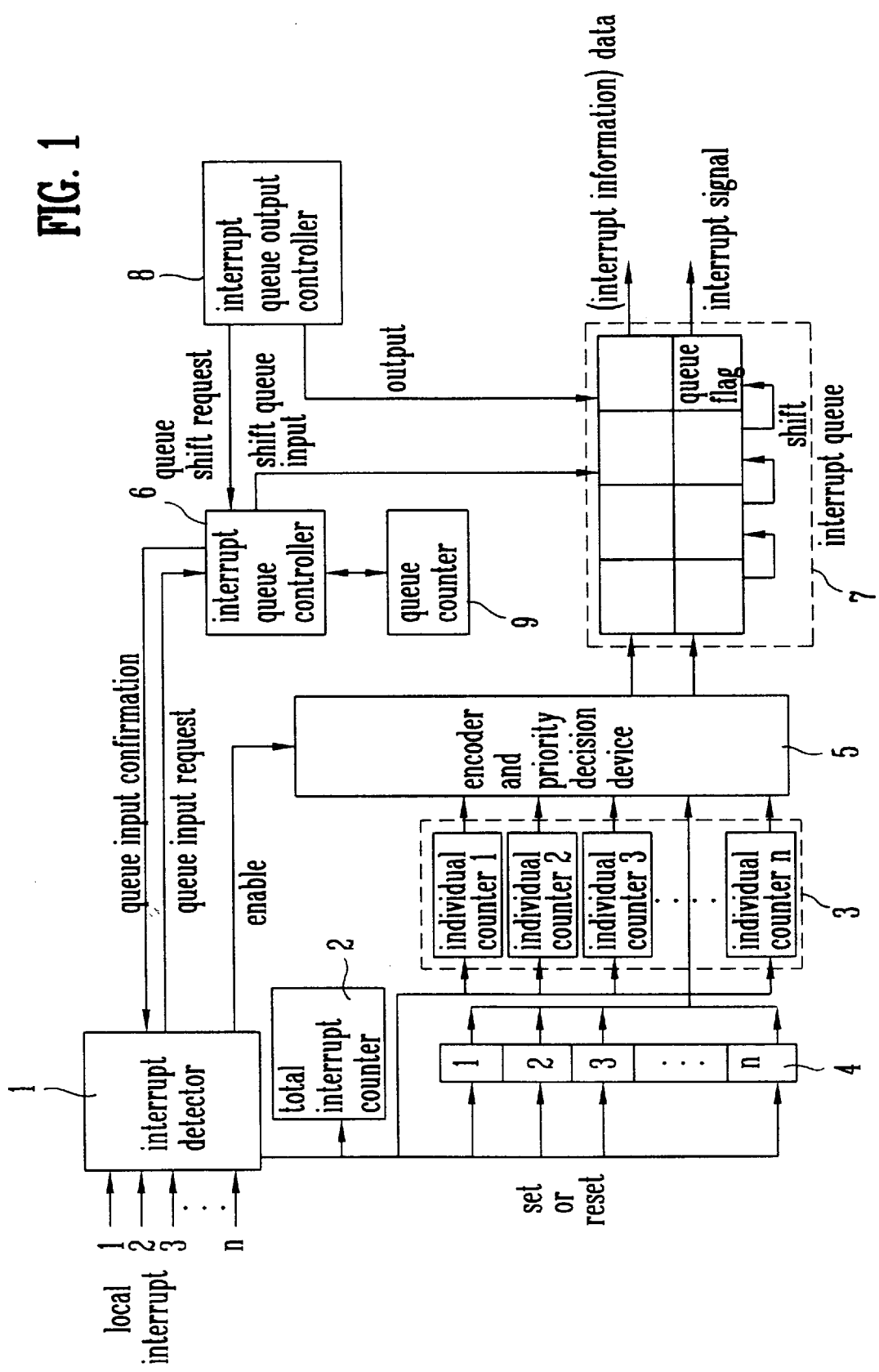
FIG. 1 is a block diagram of a multiple interrupt controller according to the present invention.

Referring now to FIG. 1. there is shown a block diagram of a multiple interrupt controller according to the present invention, which consists of an interrupt detector 1, a total interrupt counter 2, a n number of individual interrupt counters 3, interrupt flags 4, an encoder and priority decision device 5, an interrupt queue controller 6, an interrupt queue 7, and an interrupt output controller 8.

The interrupt detector 1 detects interrupts from local interrupt resources 1, 2, 3, . . . n, sets corresponding interrupt flags 4, the total interrupt counter 2, and the individual interrupt counters 3. In order that the interrupt detector 1 transmits interrupt information to a host system by digitizing information related to the corresponding interrupt flags 4 through the encoder 5, it sends a queue input request signal to the interrupt queue controller 6. At this time, in case that several interrupts are simultaneously detected, the interrupt detector 1 decides the priority between the several interrupts simultaneously detected using information of the total interrupt counter 2 and the individual interrupt counter 3 as a basic priority decision factor according to the order that the ratio of an individual interrupt number to a given total interrupt number of the total interrupt counter 2 is small, and requests the interrupt queue controller 6 for a queue input in lower-ratio order. Then, the interrupt detector 1 receives a queue input confirmation signal from the queue controller 6 and then resets the corresponding flag.

The interrupt queue controller 6 receives a queue input request from the interrupt detector 1 and a queue shift request from the interrupt queue output controller 8, controls the interrupt queue 7, and includes the queue counter 9 for addressing the queues. When the queue input request is received from the interrupt detector 1, the interrupt queue controller 6 inputs it to a queue corresponding to the present value of the queue counter 9 and then transmits a queue input confirmation signal to the interrupt detector 1, thereby completing a queue input operation. When the queue shift request is received from the interrupt queue output controller 8, the interrupt queue controller 6 performs a function of right shifting the interrupt queue 7.

The interrupt queue output controller 8 receives a queue output request from the host system, outputs 0-th queue of the interrupt queue 7 to the host system via a pended bus, and simultaneously performs a function of requesting a queue shift toward the interrupt queue controller 6. The interrupt request signal for the host system is generated through the pended bus using a queue flag indicating whether the interrupt queue is valid or not, and if any valid queue does not exist, any interrupt request signal is not generated.

Figure 2:
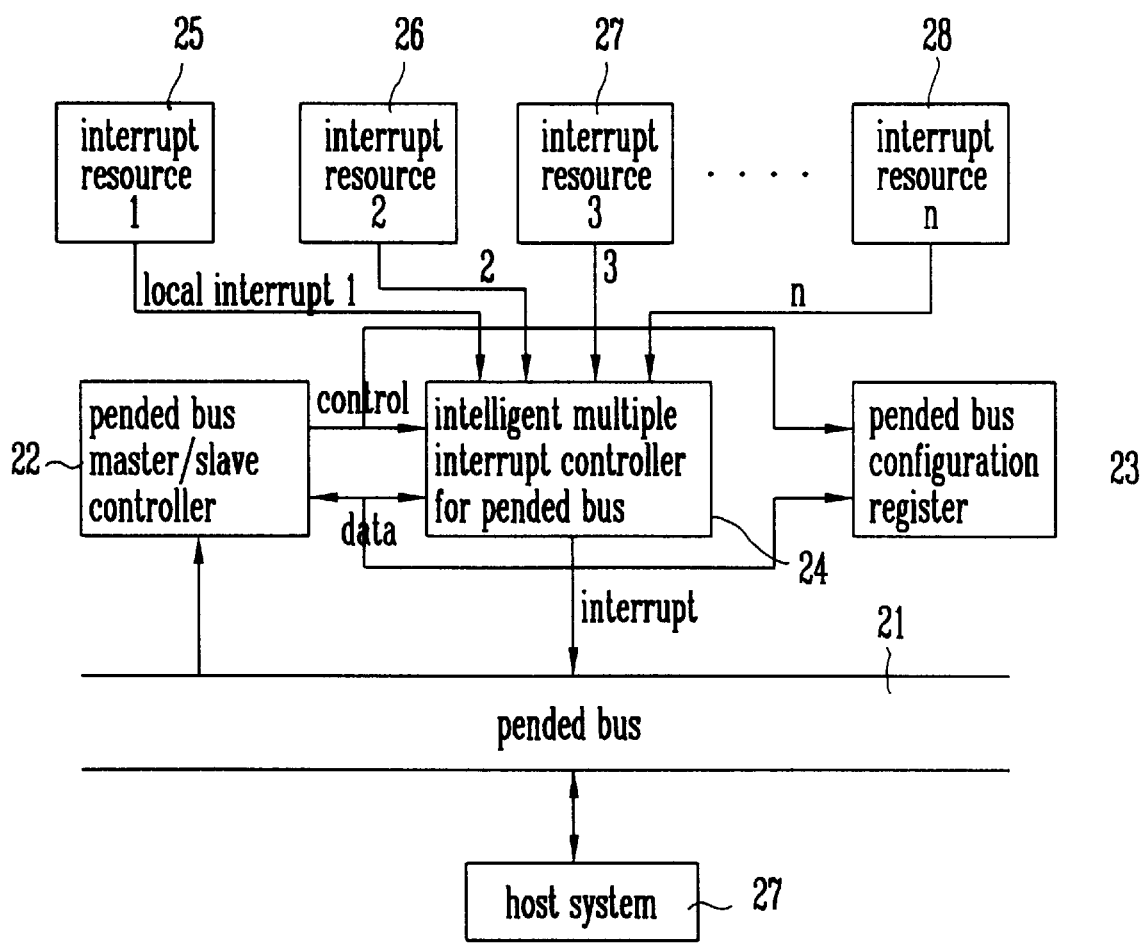
FIG. 2 is a block diagram of a system to which the present invention is applied.

In FIG. 2, there is showing a block diagram illustrating the construction and the peripheral functional blocks thereof according to the present invention, which illustrates multiple interrupt controller of the present invention in the system for pended bus connected to the host system via the pended bus. The pended bus system is constructed of a bus master/slave controller 22 responsible for transmitting data through the pended bus 21, and a pended bus configuration register 23 for storing a pended bus configuration as essential components. It can be seen from the drawing that these essential components and the intelligent multiple interrupt controller for Pended bus 24 according to the present invention are connected each other.

The intelligent multiple interrupt controller for pended bus 24 serves to receive interrupts from the local interrupt resources 25 through 28 and then to transmit them via the pended bus 21 to the host system 27 connected thereto, and the interrupt lines between the multiple interrupt controller 24 and the host system 27 are directly connected via the pended bus 21. The queue output request from the host system 27 is also transmitted to the multiple interrupt controller 24 through the pended bus master/slave controller 22 being an essential component of the pended bus system. The control flow according to the present invention can be classified into a control flow of the interrupt detector and an input/output control flow of the interrupt queue, each description thereof will be given as follows.

Figure 3:
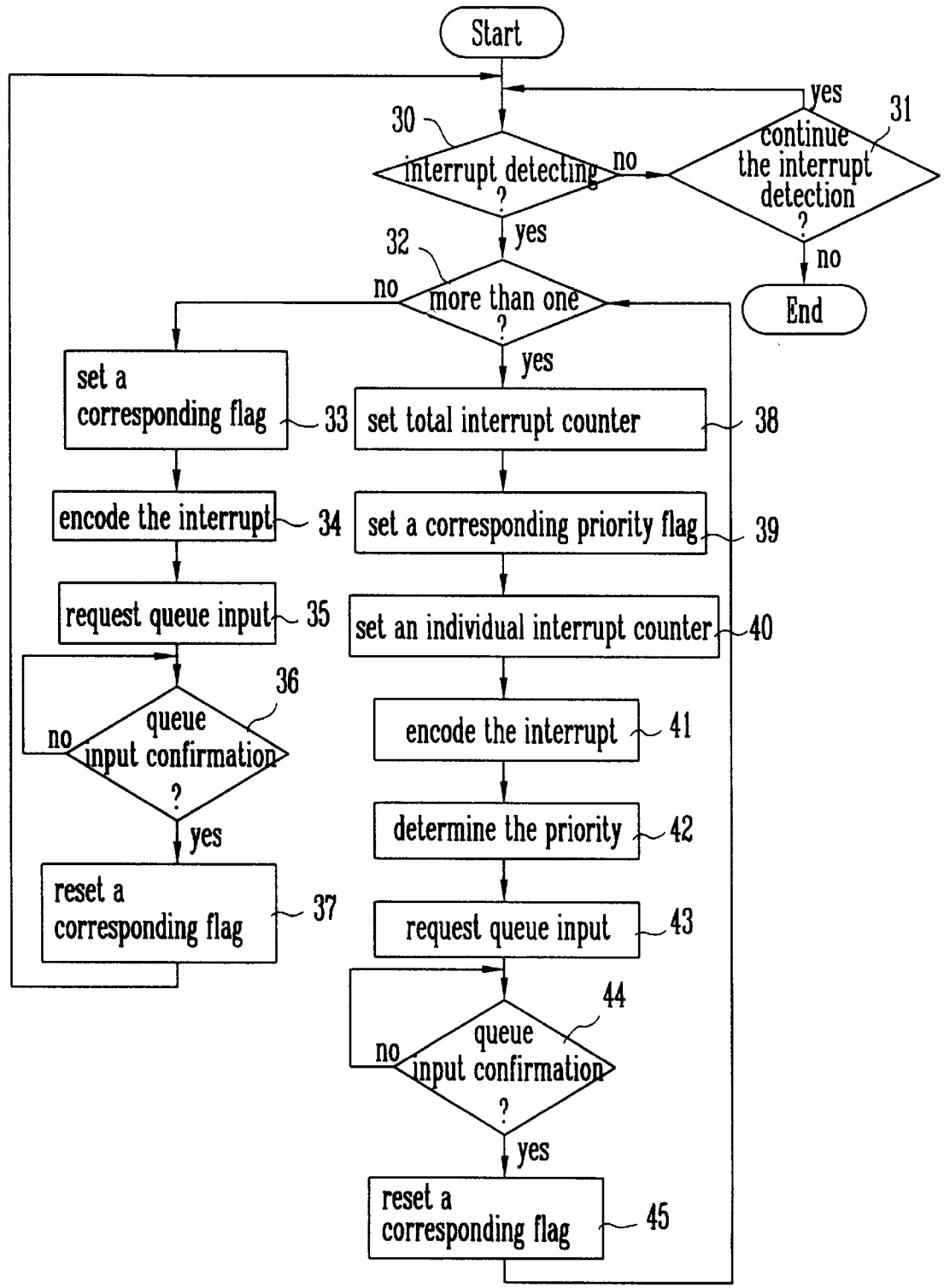
FIG. 3 is a flow chart of control of an interrupt detector in the multiple interrupt controller according to the present invention.

First, in FIG. 3, there is shown a flow chart of control of the interrupt detector, which is responsible for interrupt detection, interrupt flag setting or resetting, interrupt encoding and priority decision etc.

Upon receipt of the start signal, it is repetitively checked whether an interrupt has been detected at steps 30 and 31. If the interrupt has been detected at step 31, it proceeds to step 32, in which it is first checked whether the detected interrupt is more than one. If the detected interrupt is one, it proceeds to step 33 in which a corresponding flag is set, and then it proceeds to step 34 in which the interrupt is encoded. Then it proceeds to step 35 in which the interrupt queue controller is requested to input a queue. Thereafter, while checking whether the queue input confirmation signal has been arrived from the interrupt queue controller at step 36, if so, it proceeds to step 37 in which a corresponding flag is reset, and then it branches to a start state. However, the detected interrupt is more than one at said step 32, it proceeds to step 38 in which a total interrupt count is set, and then it proceeds to step 39 in which a corresponding priority flag is set. Thereafter, it proceeds to step 40 in which an individual interrupt count is set, and then it proceeds to step 41 in which encoding operation is performed. Then it proceeds to step 43 in which the interrupt queue controller is requested to input a queue. Thereafter, while checking whether the queue input confirmation signal has been arrived from the interrupt queue controller at step 44, if so, it proceeds to step 45 in which a corresponding flag is reset, and then it branches to said step 32 in which it is checked whether the interrupt is more than one. As thus, until the priority is decided in the priority decision device, and simultaneously the detected interrupts are all inputted to the interrupt queue based on the determined order, these process are repetitively performed.

Figure 4:
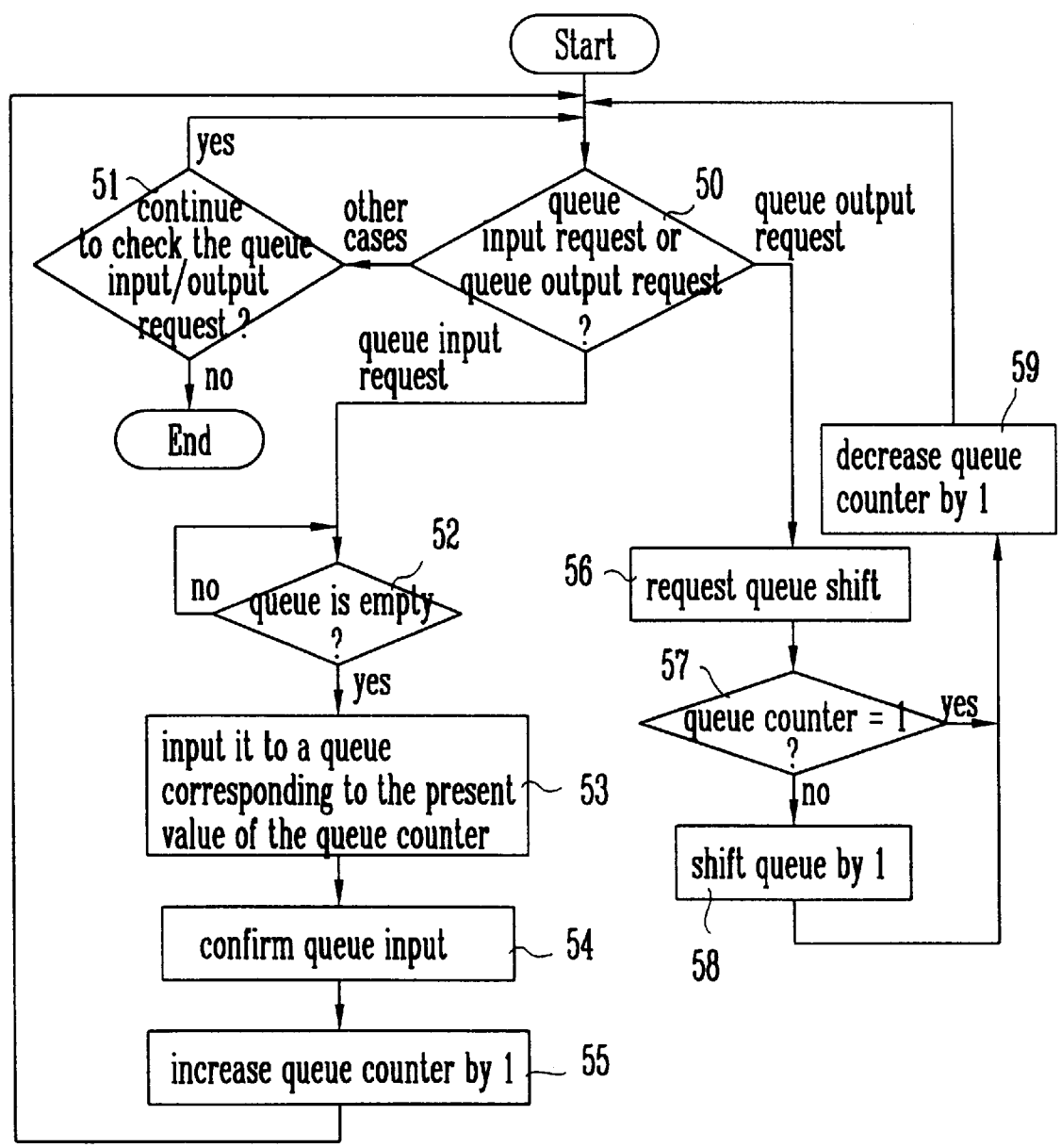
FIG. 4 is a flow chart of control of an interrupt queue in the multiple interrupt controller according to the present invention.

FIG. 4 is a flow chart of input/output control of an interrupt queue, which illustrates the operation between the interrupt queue controller for controlling an interrupt queue and the interrupt queue output controller.

First, upon receipt of a start signal, the interrupt queue controller repetitively checks whether a queue input request from the interrupt detector or a queue output request from the host system does exist at step 50 and 51. If the queue input request from the interrupt detector exists at said step 51, it proceeds to step 52 in which it is first checked whether the queue is empty. If so, it proceeds to step 53 in which it is inputted to a queue corresponding to the present value of the queue counter, and then it proceeds to step 54 in which a queue input confirmation signal is generated to the interrupt detector. Then it proceeds to step 55 in which the queue counter is increased by 1, and then it branches to a start state. If a queue output request is issued from the host system at said step 52, it proceeds to step 56 in which the interrupt queue output controller requests the interrupt queue controller for an interrupt queue shift, and then it proceeds to step 57 in which the interrupt queue controller checks a queue counter, determines whether the value of the queue counter is 1. If so, it proceeds to step 59 in which the value of only the queue counter is decreased by 1, and then it branches to a start state. If the value of the queue counter is not 1, it proceeds to step 58 in which the queue is right shifted by 1, and then it proceeds to step 59 in which the value of the queue counter is decreased by 1 and then branches to step of a start state.

As described above, the present invention has outstanding effects which can overcome a problem of an interrupt handling delay time which is caused due to the conventional fixed-priority decision method when a single interrupt line is used multiplexedly in the computer system using a pended bus, and a problem of a starvation generated by adopting the lowest priority. In addition, in case the present invention is applied to a board design for multi-functional devices etc., it has an outstanding effect that it can provide an balanced interrupt service with all the devices sharing an interrupt line, thereby making possible to be applied to the hardware in which limited interrupt lines is given.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be within the scope and spirit of the present invention are to be encompassed as further embodiments of the present invention.

What is claimed is:

1. A multiple interrupt controller using an intelligent priority-decision mechanism, comprising:

an interrupt detector for detecting interrupts generated by local interrupt resources;

a total interrupt counter operatively connected to said interrupt detector for counting and representing a total interrupt number detected at said interrupt detector;

a plurality of individual interrupt counters for counting a number of said interrupts generated by each one of said local interrupt resources;

an interrupt flag operatively connected to said interrupt detector for being set when an interrupt corresponding to said interrupt flag is detected from said interrupt detector;

an encoder and a priority decision device operatively connected to said interrupt detector, said individual interrupt counters, and said total interrupt counter for encoding interrupt information and deciding a priority for each of said interrupts using information from said total interrupt counter and said plurality of individual interrupt counters as a basic factor;

an interrupt queue controller comprising a queue counter, and operatively connected to said interrupt detector for receiving a queue input request from said interrupt detector, and a queue shift request from said interrupt queue output controller, controlling an interrupt queue, and addressing the queue;

an interrupt queue output controller operatively connected to said interrupt queue controller for receiving a request from a host system to output an O-th queue of the interrupt queue to said host system via a Pended bus, and simultaneously requesting a queue shift for said interrupt queue controller; and said interrupt queue operatively connected to said encoder and priority decision device, said interrupt queue controller, and said interrupt queue output controller for preserving temporary interrupts to be shifted when receiving said queue shift request from said interrupt queue output controller.

2. A method of controlling multiple interrupts using an intelligent priority-decision mechanism, comprising the steps of;

a. repeatedly confirming whether an interrupt has been detected;

b. checking whether the number of the detected interrupt is more than one if an interrupt has been detected at said step a.;

c. setting a flag corresponding to the detected interrupt if the number of the detected interrupt is one in steps b.;

d. encoding the detected interrupt after step c.;

e. requesting a queue input from the interrupt queue controller after step d.;

f. confirming the queue input;

g. resetting the flag corresponding to the detected interrupt and returning to step a. when receiving a queue input confirmation signal in step f.;

h. setting a total interrupt counter if the number of the detected interrupt is greater than one in step b., i. setting a corresponding priority flag after step h.;

j. setting an individual interrupt counter after step i.;

k. encoding the detected interrupt after step j.;

l. requesting a queue input from the interrupt queue controller after step k.;

m. confirming the queue input after step l.; and n. resetting flag corresponding to the detected interrupt when receiving a queue input confirmation signal in step m. and returning to step a.

3. A method of controlling multiple interrupts using an intelligent priority-decision mechanism, comprising the steps of:

a. repeatedly confirming at an interrupt queue controller whether a queue input request from an interrupt detector or a queue output request from a host system has been received by said interrupt queue controller;

b. checking whether the queue is empty or not if the queue input request is received in step a.;

c. inputting to a queue corresponding to a value of a present queue counter if there is an empty queue in step b.

d. generating a queue input confirmation signal after step c.;

e. increasing the value of the queue counter by 1 and returning to step a. after step d.;

f. requesting an interrupt queue shift by said interrupt queue output controller if the queue output request is received in step a.;

g. confirming a queue counter by said interrupt queue controller after step f.;

h. decreasing the value of the queue counter by 1 after step g. if the value of the queue counter is 1 at step a. and returning to step a., and right shifting the queue by 1, decreasing the value of the queue counter by 1 and returning to said step a. after step g. if the value of the queue counter is not equal to 1.

* * * * *